US007664573B2

(12) United States Patent
Ahmed

(10) Patent No.: US 7,664,573 B2
(45) Date of Patent: Feb. 16, 2010

(54) INTEGRATED BUILDING ENVIRONMENT DATA SYSTEM

(75) Inventor: Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 667 days.

(21) Appl. No.: 10/952,705

(22) Filed: Sep. 29, 2004

(65) Prior Publication Data

US 2005/0154494 A1 Jul. 14, 2005

Related U.S. Application Data

(63) Continuation-in-part of application No. 10/672,527, filed on Sep. 26, 2003, now abandoned.

(51) Int. Cl.
*G05D 23/00* (2006.01)
(52) U.S. Cl. .......................... 700/276; 700/19
(58) Field of Classification Search ................. 700/276, 700/19
See application file for complete search history.

(56) References Cited

U.S. PATENT DOCUMENTS

| 5,297,252 | A | 3/1994 | Becker ........................ 395/160 |
| 5,361,198 | A | 11/1994 | Harmon et al. ............. 364/188 |
| 5,562,537 | A | 10/1996 | Zver et al. |
| 5,631,825 | A | 5/1997 | Van Weele et al. .......... 364/188 |
| 6,137,403 | A | 10/2000 | Desrochers et al. ......... 340/540 |
| 6,169,927 | B1 | 1/2001 | Schonthal ...................... 700/1 |
| 6,199,575 | B1 | 3/2001 | Widner ........................ 137/227 |
| 6,232,968 | B1 | 5/2001 | Alimpich et al. ............. 345/333 |
| 6,353,853 | B1 | 3/2002 | Gravlin |
| 6,471,853 | B1 | 10/2002 | Moscaritolo |
| 6,625,500 | B1 | 9/2003 | Li |

2001/0025349 A1 9/2001 Sharood et al. ............. 713/340

(Continued)

FOREIGN PATENT DOCUMENTS

EP 0940787 A2 9/1999

(Continued)

OTHER PUBLICATIONS

Finch E. "Is IP Everywhere the Way Ahead for Building Automation". Facilities 11/12 (2001): 396-403.*

(Continued)

*Primary Examiner*—Ryan A Jarrett
(74) *Attorney, Agent, or Firm*—Michael J. Wallace

(57) ABSTRACT

A system for gathering date in a space includes a data server, a first wireless module operably connected to the data server, a first plurality of wireless sensor modules, and at least one other wireless sensor module. The first plurality of wireless sensors module are operable to generate sensor data relating to the control and operation of an HVAC system. The first plurality of wireless sensor modules are also operable to communicate the first sensor data to the first wireless module. The at least one other wireless sensor module is operable to generate second sensor data relating to at least one of the group consisting of light fixtures, architectural fixtures and plumbing fixtures, office equipment, and vending machines and furniture. The at least one other wireless sensor module is also operable to communicate the second sensor data to the first wireless module.

27 Claims, 8 Drawing Sheets

U.S. PATENT DOCUMENTS

| | | |
|---|---|---|
| 2001/0040509 A1 | 11/2001 | Dungan |
| 2002/0022894 A1 | 2/2002 | Eryurek et al. ............... 700/80 |
| 2003/0065472 A1* | 4/2003 | Eckel et al. ............... 702/130 |
| 2003/0118353 A1* | 6/2003 | Baller et al. ............... 399/8 |
| 2004/0008651 A1 | 1/2004 | Ahmed |
| 2004/0019392 A1 | 1/2004 | Hirai |
| 2004/0049577 A1 | 3/2004 | Imhof |
| 2004/0088082 A1 | 5/2004 | Ahmed |
| 2004/0130458 A1* | 7/2004 | Koutsoukos et al. ... 340/870.01 |
| 2004/0144849 A1 | 7/2004 | Ahmed |

FOREIGN PATENT DOCUMENTS

| | | |
|---|---|---|
| EP | 1696371 | 8/2006 |
| WO | WO99/57697 | 11/1999 |
| WO | WO00/54237 | 9/2000 |
| WO | WO01/26330 A2 | 4/2001 |
| WO | WO01/35190 A2 | 5/2001 |
| WO | WO01/93220 A1 | 12/2001 |
| WO | WO02/31607 A2 | 4/2002 |
| WO | 2004038525 | 5/2004 |

OTHER PUBLICATIONS

Asada et al., "Wireless Integrated Network Sensors: Low Power Systems on a Chip." European Solid State Circuits Conference, 1998, The Hague, Netherlands, (8 pages).

PCT International Search Report—2002P01349WO, mailed on Oct. 8, 2003.

PCT International Search Report—2002P11662WO, mailed on Dec. 2, 2003.

* cited by examiner

INTEGRATED BUILDING ENVIRONMENT DATA SYSTEM

CROSS-REFERENCE TO RELATED APPLICATIONS

This is a continuation in part of U.S. patent application Ser. No. 10/672,527, filed Sep. 26, 2003, now abandoned and which is incorporated herein by reference.

FIELD OF THE INVENTION

The present invention relates generally to building environments, and particularly with data systems in building environments.

BACKGROUND OF THE INVENTION

Building structures are a fundamental aspect of human existence. Building structures provide the work, living and recreation environments upon which we rely. Large complex buildings, such as for example, work places and multi-family living structures, often require the interaction of many devices during normal use. Some devices in buildings have extensive building system infrastructures.

One common category of building systems having infrastructures are building control systems or building automation systems. Such systems including heating, ventilation and air conditioning ("HVAC") systems, security systems, fire safety systems, and the like. HVAC systems are typically designed to provide relatively comfortable environmental conditions in which people (or other living things) may work, rest, or otherwise carry on the tasks of life. Security systems operate primarily to ensure only authorized access to or occupancy of a building or portions of building. Fire safety systems operate to detect and provide notice of emergency conditions, as well as to adjust other building systems for proper during operation during an emergency. Such building control systems often require extensive communications to disparate areas of the building and thus incorporate significant physical infrastructure in the form of wiring and cabling, among other things.

However, besides building automation system devices, a building contains hundreds of other devices that also need to be managed for proper operation, maintenance, and service. Such devices may include, by way of example, light fixtures and/or ballasts, photocopiers or reproduction devices, vending machines, coffees machines, water fountains, plumbing fixtures, doors and other similar elements. A specialized building such as laboratory facility for research may contain even more devices that need to managed, in the form of specialized laboratory equipment. Examples of such equipment will include autoclaves, deep freezers, incubators, biosafety cabinets, oven etc.

These other common building devices do not normally involve an extensive building-wide communication infrastructure. Attempts to obtaining data from each specific device using dedicated communication channel can be extremely cost-prohibitive and technically challenging considering the wiring needs.

While these autonomous, non-communicative building devices do not have the same need for extensive building-wide communication as, for example, a heating system or security alarm system, the operations of such devices is often vital to providing a safe, productive and positive environment. For many building infrastructure devices, such as light fixtures, doors, windows and plumbing, the responsibility for ensuring their proper operation is through a building maintenance services organization. For other building devices, such as vending machines, specialized laboratory or office equipment, the responsibility for ensuring their proper operation is often through specialized service providers.

One issue associated with various building devices is the elapsed time between discovery of a malfunction, communication of the malfunction to the appropriate service provider, and the response time of the provider. Such elapsed time may not have any dangerous or even manifestly costly consequences. However, a poorly maintained building is not conducive to productive and satisfied occupants.

While current service systems for building devices have adequately served the needs of building occupants, it is nevertheless desirable to shorten the lead time between the onset of a building device malfunction and its remedy. Accordingly, there exists a need to improve the maintenance of building devices.

SUMMARY OF THE INVENTION

The present invention addresses the above referenced need, as well as others, by providing an integrated building data acquisition and communication system. In one embodiment, the present invention employs communicative devices (some of which preferably employ micro-electromechanical or MEMS technology) to obtain data from various building devices. The devices then communicate to a system that makes the data available for service providers, maintenance organizations, or other parties. In a specific embodiment, an existing building automation system ("BAS") communication infrastructure may be used to communicate the acquired data to a data repository, and various parties may access data in the repository.

A first embodiment of the invention is a method that includes the step of operating a building automation system data acquisition infrastructure. The method further includes the step of using the building automation system data acquisition infrastructure to obtain a first set of data pertaining to at least one building automation system, the at least one building automation system comprising at least one the group consisting of a fire safety system, a building security system and a heating, ventilation and air conditioning (HVAC) system. The method also includes the step of obtaining at least a second set of data based on information generated by at least one device via a wireless sensor module, the second set of data being non-intersecting with the first set of data. The method also includes the step of controlling the at least one building automation system using the first set of data and to the exclusion of the second set of data. The method further includes the step of using the building automation system data acquisition infrastructure to provide access to at least the second set of data to an authorized user.

By providing a first set of data used to control BAS operations, and providing a second set of data that is used for other purposes, large amounts of data not traditionally used for HVAC, security or fire safety systems may be gathered and made available to various parties. Such data may be used to shorten lead times in maintenance of building devices such as light fixtures, doors, vending machines, water fountains and the like. In addition, other conditions of such devices may be monitored, or tracked for trending purposes, which may lead to information useful in making building systems more efficient.

The above described features and advantages, as well as others, will become more readily apparent to those of ordi-

DETAILED DESCRIPTION

Figure 1:
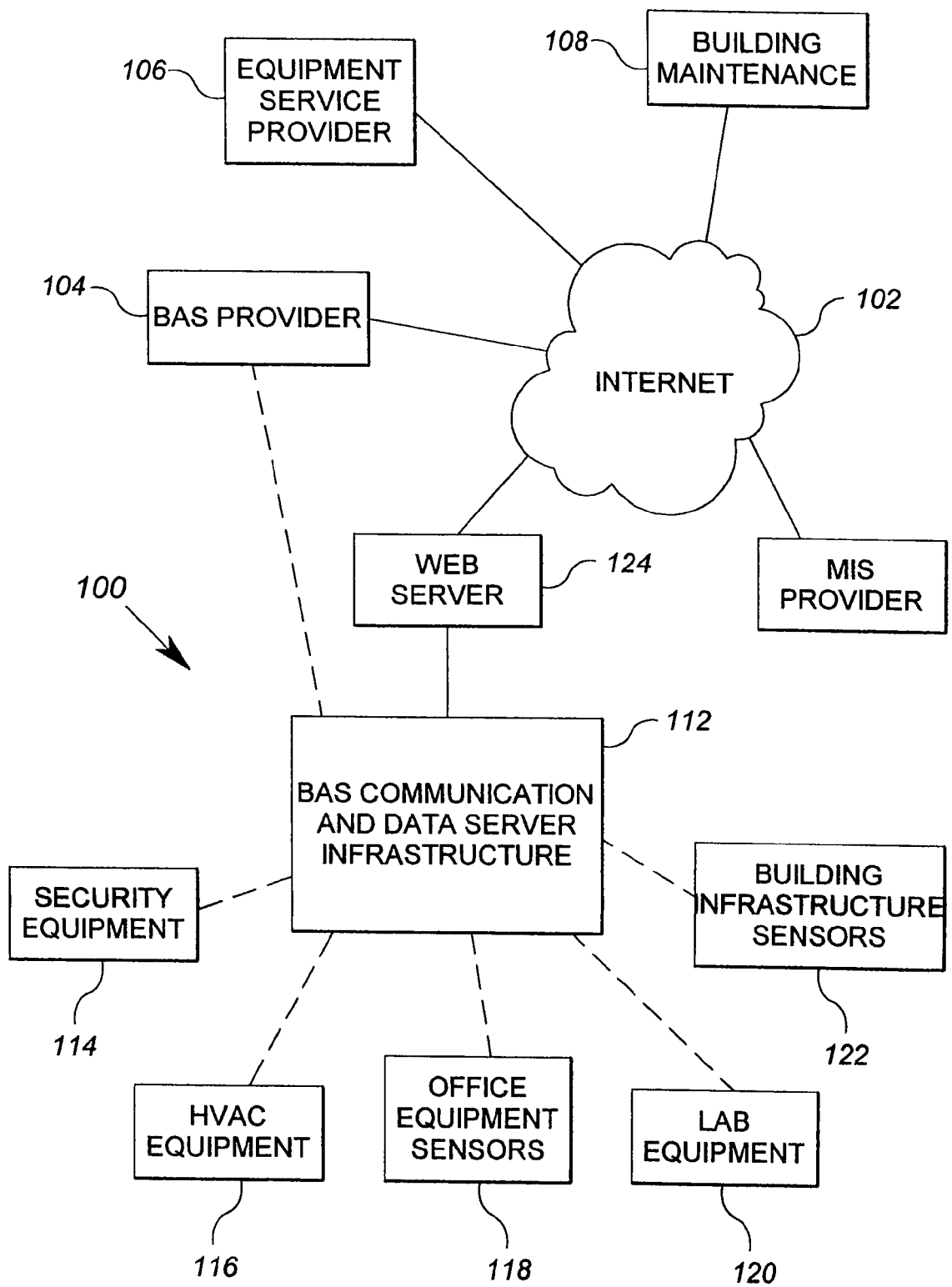
FIG. 1 shows a block diagram of a system for obtaining and distributing building-related data in accordance with aspects of the invention.

FIG. 1 shows a system 100 for obtaining and distributing building-related data in accordance with aspects of the invention. The system 100 is shown in FIG. 1 connected to the Internet 102, thereby allowing access to the building data generated by the system 100 by a number of authorized users, illustrated by way of example here by building automation services (BAS) Provider 104, Equipment Service Provider 106, a Building Maintenance Service Provider 108, and an Information Services Provider 110. In general, the system 100 performs normal BAS operations and further makes building data (whether or not such data is necessary to BAS operations) to third parties. Typically, data is made available to the third parties on a pre-arranged basis.

The system 100 includes a BAS communication and data server infrastructure 112, building security devices 114, HVAC control devices 116, office equipment sensors 118, laboratory equipment sensors 120, and building infrastructure sensors 122.

The building security devices 114 include devices that track, regulate and/or control access to the building, as well as detect potential security threats. For example, building security devices may include door interlocks, card readers, security cameras, motion sensors, and the like. Building security systems are well known. The building security devices 114 are connected to the BAS communication and data server infrastructure 112 to allow for remote monitoring and control of those devices.

The HVAC control devices 116 include devices the sense environmental conditions such as temperature or air quality, and control machines that can alter those environmental conditions. For example, HVAC control equipment 116 may include, but are not limited to, temperature sensors, air flow sensors, gas sensors, ventilation damper actuators, blower controllers, chilling plant controllers, and heating and/or cooling water valve actuators. HVAC systems are well known. The HVAC control devices are connected to the BAS communication and data server infrastructure 112 to allow for remote monitoring and control of these devices.

It will be appreciated that HVAC control devices 116 may suitably be standard wired devices as is known in the art. In other words, sensors and actuators receive and transmit data and/or control signals over wire lines. However, at least some of the HVAC control equipment 116 may include wireless MEMs technology, such as that described below in connection with FIG. 3.

Figure 8:
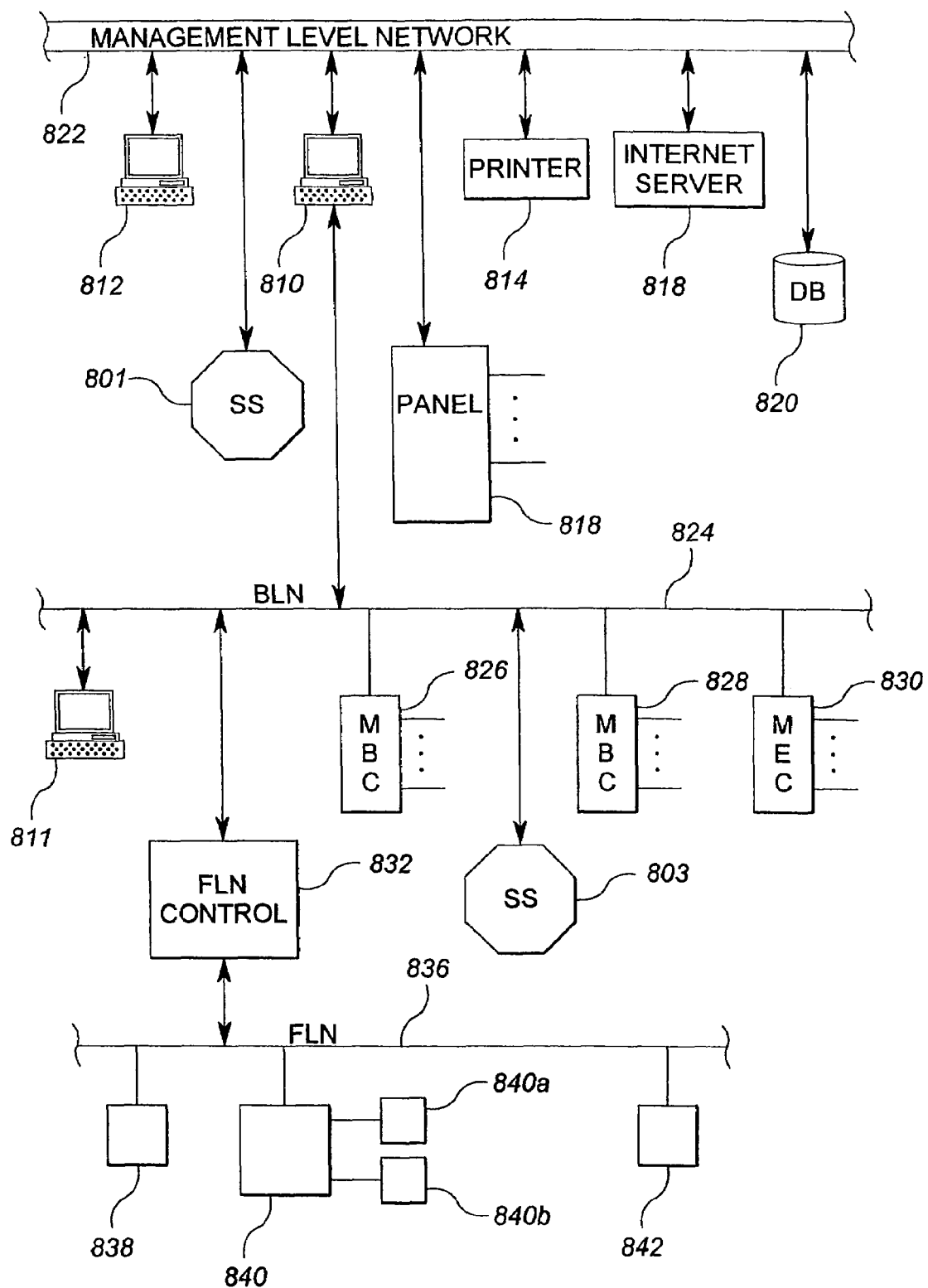
FIG. 8 shows an alternative embodiment of building system that incorporates an embodiment of the invention

The BAS communication and data server infrastructure 112 includes a number of devices interconnected by data networks that allow for centralized and/or remote access to the various control devices or systems. The hardware of the server infrastructure 112 includes one or more data networks, a number of data servers, user terminals, data storage devices and the like. Examples of the server infrastructure 112 include the APOGEE™ system available from Siemens Building Technologies, Inc. of Buffalo Grove, Ill. A simplified version of another example of the infrastructure 112 includes the communication network 206, control station 202, the data store 204 and space communication hubs 214 and 230 of FIG. 2, discussed further below. A more detailed example of a BAS communication and data server infrastructure 112 modeled more along the lines of the APOGEE™ system is shown in FIG. 8, and includes elements 801, 803, 810, 812, 814, 820, 822, 824, 832 and 836, described further below.

Figure 2:
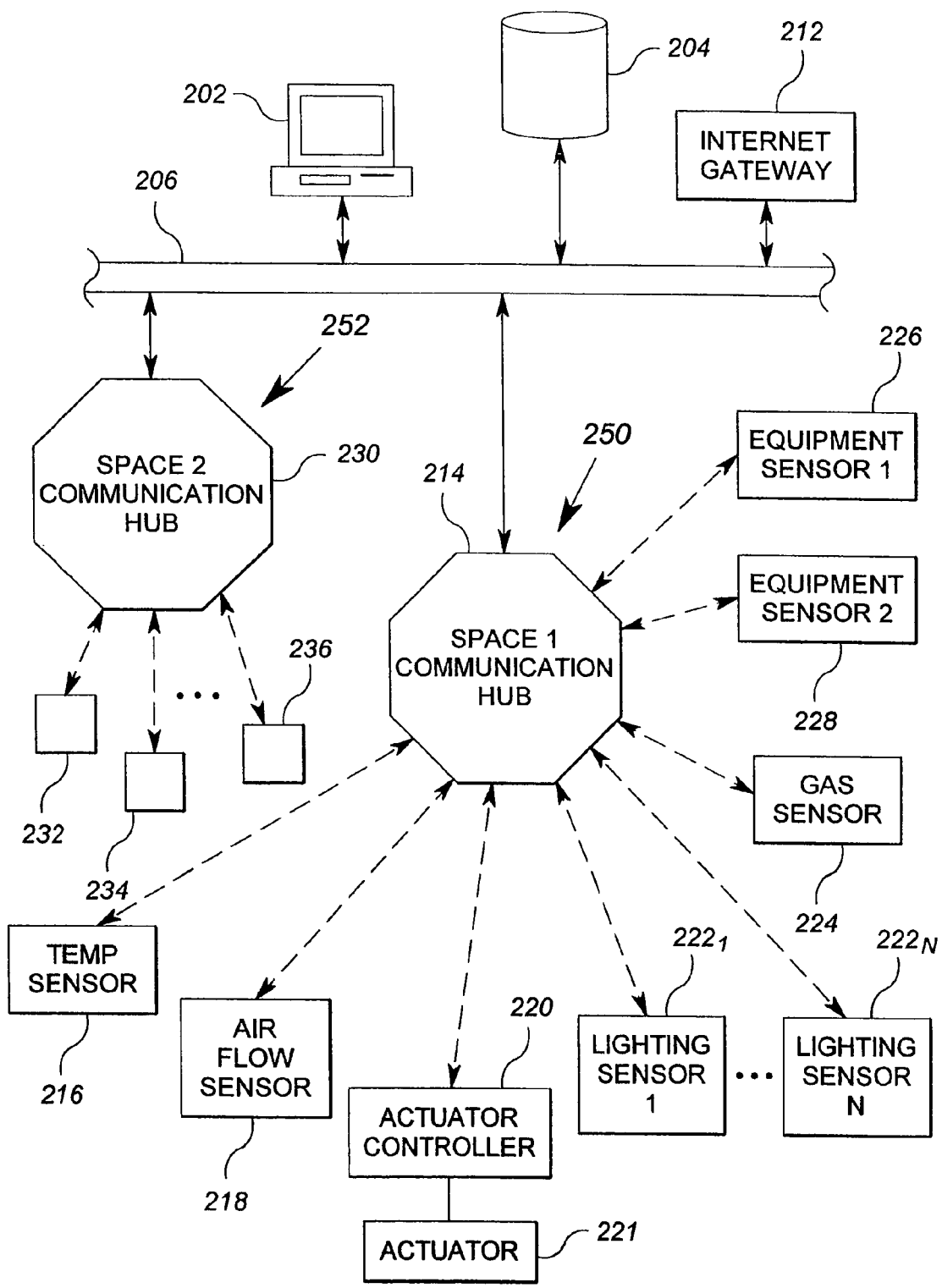
FIG. 2 shows in further detail a schematic block diagram of a portion of an exemplary embodiment of the system of FIG. 1.

In addition to the standard BAS devices described above, the BAS communication and data server infrastructure 112 further includes one or more wireless communication hubs that allow various equipment to access the BAS infrastructure 112 using wireless communications. FIG. 2 shows two examples of such wireless communication hubs 214 and 230.

The infrastructure 112 is coupled to the Internet 102 through an internet server 124. It is noted that the internet server 124 represents a combination of software and hardware functions that may suitably be carried out on the same physical host as one or more of the elements in the infrastructure 112. The internet server 124 is operable to present data from the infrastructure as either a Web page or as downloadable files. Two different examples of internet servers 124 that interact with BAS infrastructures are shown in U.S. Pat. No. 6,353,853, and U.S. patent application Ser. No. 10/463,818, both of which are incorporated herein by reference, the latter of which is assigned to the assignee of the present invention.

In accordance with aspects of the present invention, the BAS infrastructure 112 further permits access to data generated by (or derived from data generated by) office equipment sensors 118, laboratory equipment sensors 120, and building infrastructure sensors 122. Thus, the BAS infrastructure 112 in combination with such devices can provide a comprehensive building data acquisition solution. Since the BAS infrastructure is already required to carry out the BAS-related services, such as HVAC, security and fire safety services, the additional data services may be obtained without requiring major re-configuration of physical communication lines and cables, and without necessarily adding much in the way of physical computing equipment.

The office equipment sensors 118 include wireless sensor systems that preferably provide information regarding the operation and/or condition of one or more pieces of office equipment. Office equipment can include photocopiers, printers, video conferencing devices, music systems, and even IT routers and the like. Wireless sensor systems typically include a source of power, a sensor element, processing circuitry, and wireless communication circuitry. (See, e.g., sensor module 304 of FIG. 3). The wireless sensor systems may be used to monitor a number of facets of operations, such as temperature of a heating element, voltage through a particular component, or even data flow rates. The monitored data preferably provides information as to the performance, or as to the potential need for servicing of a device. The selection of data points to monitor will depend on the piece of equipment being monitored, and may be readily determined from service instructions or manuals relating to the piece of equipment. As will be discussed further below, MEMs devices that include a MEMs sensor, processing circuitry and wireless communication capability may be used to gather data for a variety or sensed conditions, such as voltage, current, heat, acceleration, pressure, and the presence of various gasses.

By way of example, an office equipment sensor 118 can be a MEMS pressure sensor that detects excessive pressure on the printer head or on the printer roller, which can be caused by dirt or debris. In another example, an office equipment sensor 118 may be a MEMS temperature sensor that can detect the unusual performance of a thermal inkjet printer by recording excessive temperature due to overheating elements. Such data can be gathered by the infrastructure 112 using a local wireless communications, and then provided to the printer service provider (e.g. Maintenance Service Provider 108) for immediate action or notification to the users through web message or e-mail.

The laboratory equipment sensors 120 include wireless sensor systems that preferably provide information regarding the operation and/or condition of one or more pieces of laboratory equipment. Laboratory equipment can include fume hoods, incubators, centrifuges and the like. The wireless sensor systems may also be MEMs-based devices that include processing and wireless communication circuitry. The wireless sensor systems may be configured to monitor operational conditions of the laboratory equipment for scientific and/or maintenance purposes.

Thus, the laboratory equipment sensors 120, can be utilized in laboratory equipment to gather operating data and also to record experimental data, thereby potentially eliminating the need for equipment-specific data gathering and monitoring systems.

One example of a laboratory equipment sensor 120 may be used for gas analysis. An analyzer and/or gas chromatograph can be fitted with MEMS DSP chip that will obtain the experimental data and then transmit such data through the infrastructure 112 to a central data repository system (e.g. workstation 202 of FIG. 2). The lab users and researchers can view and analyze data from that central repository system using a host of software. In another example, the laboratory equipment sensor 120 can include a MEMS device containing a sensor suite for temperature, flow, and different gases can be used to monitor the health of the equipment. Such data can be transmitted to the equipment manufacturers via the Internet 102 for predictive maintenance, optimum operation, and eliminating costly downtime.

The building infrastructure sensors 122 include wireless sensor systems that preferably provide information regarding the operation and/or condition of one or more parts of the building infrastructure. The building infrastructure can include architectural features such as doors, windows, ceilings or the like. Building infrastructure can also include plumbing fixtures and lighting fixtures. As with the office equipment sensors 118 and laboratory equipment sensors 120, the wireless sensor systems may also be MEMs-based devices that include processing and wireless communication circuitry. The wireless sensor systems may be configured to monitor operational conditions of the laboratory equipment for scientific and/or maintenance purposes.

In operation, the BAS communication and data server infrastructure 112 and the HVAC control devices 116 cooperate as is known in the art to control the various environmental conditions of the building. An authorized user, which in the example described herein includes employees of a building automation services provider 104, may access data relating to the various HVAC control devices 116 by one or more user access control stations within the BAS communication and data server infrastructure 112 (e.g. control station 202 of FIG. 2 or control stations 810 and 812 of FIG. 8).

Alternatively, the BAS provider 104 may access the HVAC device data via the Internet 102. To this end, requests from the BAS provider 104 are communicated to the web server 124 via the Internet 102. The web server 124 may suitably obtain the requested HVAC device data from the BAS communication and data server infrastructure 112 and generate a web page (using VBI scripts or the like) using such data. The web server 124 then would transmit the generated web page to the BAS provider 104. The BAS provider 104 then displays the web page using an ordinary web browser program. Alternatively, the web server 124 may generate information in a proprietary format that must be read by a specialized program at the BAS provider 104.

While the BAS provider 104 can access HVAC-relate data and control operations of the HVAC control devices 116, many of the HVAC control devices 116 cooperate to carry on low level control functions autonomously. To this end, it will be appreciated that the HVAC control devices 116 are interconnected through the BAS communication and data server infrastructure 112.

In addition, the BAS communication and data server infrastructure 112 and the building security devices 114 cooperate as is known in the art to control the various environmental conditions of the building. An authorized user may access data relating to the various building security devices 116 by one or more user access control stations within the BAS communication and data server infrastructure 112 (e.g. control station 202 of FIG. 2 or control station 810 of FIG. 4). It is noted that in the example described herein, the BAS provider 104 may actually include multiple organizations. One organization operates and/or monitors the security equipment 114 and another controls the HVAC control equipment 116. In many buildings, these organizations can overlap. Similarly, the building security equipment 114 may employ an entirely separate communication network within the BAS communication and data server infrastructure 112, or may share all or part of the networks used by the HVAC control equipment 116.

In any event, the building security and HVAC operations utilize standard control techniques to monitor, control and set up environmental conditions in the building.

In addition to the above operations, however, the system 100 of FIG. 1 provides further "smart building" features by allowing access to a large variety of building data not specifically related to a traditional BAS function such as building security, fire safety, or HVAC control. Such building data in the exemplary embodiment of FIG. 1 includes data generated by the office equipment sensors 118, the lab equipment sensors 120 and the building infrastructure sensors 122.

In particular, the BAS infrastructure 112 and the office equipment sensors 118 cooperate to acquire office equipment data regarding one or more pieces of office equipment in the building. One or more equipment service providers 106 are responsible for overseeing the maintenance and operation of the various pieces of office equipment. Such equipment service providers 106 from time to time access the office equipment data. Such data may provide information that the office equipment is in need of repair, or that it is operating suboptimally. Furthermore, if the office equipment is leased on a per-use basis, such as in the case of a photocopier, the photocopier equipment provider may obtaining usage statistics for billing purposes from the office equipment data. In another example, a vending company may obtain usage statistics in a vending machine to determine what must be re-stocked.

As will be discussed below, the BAS infrastructure 112 provides a readily available means of communicating and storing and accessing such data from diverse locations of the building. Accordingly, by employing appropriate wireless sensing devices that have an access point to the BAS infrastructure, data respecting a significant number of aspects of the building environment may be obtained and made available to remote users. Moreover, the use of MEMs technologies enables such a building because MEMs devices can be combined with wireless communication and processing circuits that require virtually no additional wiring when installed in a building. Without such technology, many of such sensors would be impracticable to implement. However, it will be understood that the architecture of the data acquisition system used herein may be implemented with other existing and future technologies that, similar to MEMs-based technology, feature reduced wiring and space requirements.

Similar to the office equipment sensors 118, the BAS infrastructure 112 and the lab equipment sensors 120 cooperate to acquire laboratory equipment data regarding one or more pieces of laboratory equipment in the building. Many buildings have laboratory equipment that is maintained by an off-site organization. In this example, one or more service providers 106 are responsible for overseeing the maintenance and operation of the various pieces of laboratory equipment. Such equipment service providers 106 from time to time access the laboratory equipment data for maintenance, usage trend information, and the like. It is also possible that laboratory equipment sensor 120 may also be used to acquire and make available actual laboratory test results. Such test results would also be available remotely through the BAS infrastructure 112 and the web server 124.

Another aspect of the smart building is the possibility of improving maintenance of non-BAS building infrastructure devices, such as lighting fixtures, plumbing, architectural elements, etc. To this end, the BAS infrastructure 112 and the building infrastructure sensors 122 cooperate to acquire infrastructure data regarding one or more elements of the building infrastructure. By way of example, wireless sensors may be attached to every light fixture to sense when the ballast requires replacement. Other wireless sensors may be attached to lavatory fixtures and water fountains to detect abnormal operation thereof.

In the example discussed herein, the building maintenance organization 108 is responsible for overseeing the maintenance and operation of the building infrastructure elements. To this end, the building maintenance organization 108 from time to time accesses the building infrastructure data via the Internet 102, or directly from control stations in BAS building and data server infrastructure 112. By obtaining such data, the building maintenance organization may increase the efficiency of their maintenance services. In the past, detection of problems in plumbing, lighting fixtures and architectural elements typically relied solely on personal observation and reporting.

Again, the use of MEMs wireless sensor devices enables such operations without drastically increasing the wiring requirements of the building. Because the HVAC and other building systems already require the presence of communication networks throughout the building, the MEMs wireless sensors do not need to be able to transmit data over long distances. Instead, the MEMs wireless sensor modules may typically use relatively low power, short range transmissions to communicate data into the BAS infrastructure 112. The need for relatively low power furthermore reduces the energy requirements of the wireless sensor and transmitter. As will be discussed below, such reduced power requirements makes a completely wireless MEMs sensor device practical.

FIG. 2 shows a portion of an exemplary embodiment of the system 100 of FIG. 1. The portion of the system 100 includes a relevant portion of a BAS infrastructure, an Internet gateway 212, exemplary HVAC equipment devices 216, 218, 220 and 221, exemplary building infrastructure sensors $222_1$ ... $222_N$, a gas sensor 224, exemplary laboratory and/or office equipment sensors 226 and 228 and various other sensors 232, 234 and 236.

The BAS infrastructure in this embodiment includes a control station 202, a mass storage device 204, a communication network 206, a first space communication hub 214 and a second space communication hub 216. The communication network 206 is a network that allows data communication between the various devices connected thereto. By way of example, the communication network 206 may suitably be an Ethernet standard network that employs the TCP/IP protocol. Many BAS infrastructures will include multiple networks, such as that illustrated in FIG. 8, discussed further below. The mass storage device 204 includes memory for storing data regarding the structure of the system 100, as well as archived data regarding the operation of the system 100. The mass storage device 204 may include one or more permanent storage media such as disk drives, tape drives, and the like.

The control station 202 is a device that includes a user interface and is operable to provide user control over (and/or monitoring of) the BAS elements/devices of the system 100 in a manner which may suitably be the same as that provided by the model INSIGHT® Work Station used in connection with the APOGEE®, discussed above. The INSIGHT® Work Station is also available from Siemens Building Technologies, Inc, of Buffalo Grove, Ill. To provide such control, the control station 202 communicates building control data to and from such devices (directly or indirectly) over the communication network 206.

In the embodiment described herein, the control station 202 may suitably also act as a data server for non-BAS information such as information relating to building infrastructure and maintenance, office equipment, and other equipment not traditionally related to BAS (fire, security, HVAC) operation. Examples of devices for which building information may be generated include light fixtures, architectural fixtures and plumbing fixtures, office equipment, laboratory equipment, vending machines and furniture. The control station 202 may suitably acquire such data and store data locally or in the mass storage device 204 for use by authorized users.

As discussed above in connection with FIG. 1, each type of data may be made available for a particular user. By way of example, light, architectural and plumbing fixture information may be made available to a maintenance organization. Similarly laboratory and office equipment information may be made available to service vendors or equipment dealers. To this end, the building data may be stored in the mass storage device 204 and/or locally within the control station 202 in a manner that enables different users to have access to different data files.

Figure 7:
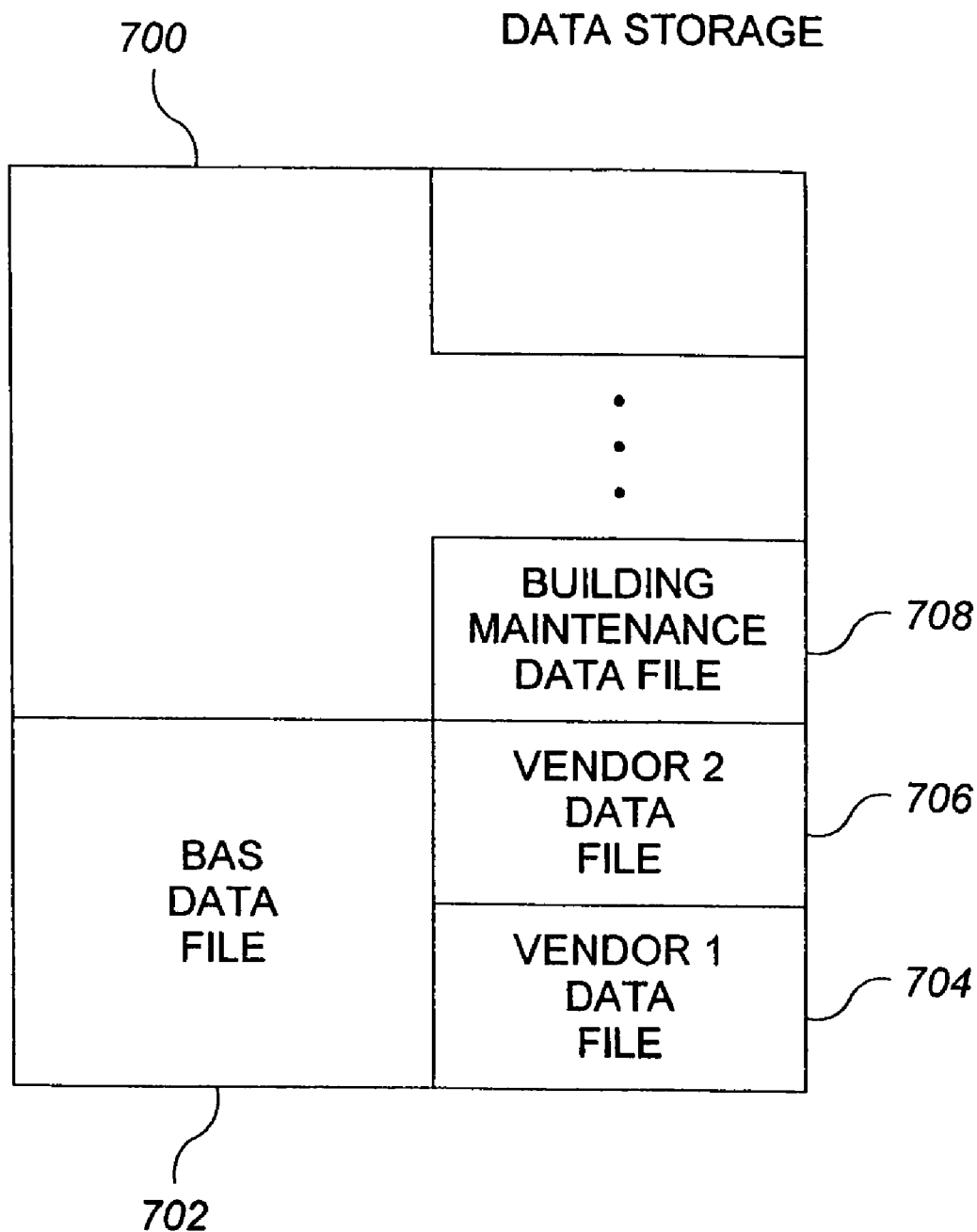
FIG. 7 shows an exemplary embodiment of a data structure according an embodiment of the present invention.

An example of a data structure that enables different users to have access to different data files is shown in FIG. 7. As shown in FIG. 7, a memory data structure 700 has separate files accessible by different authorized users. In particular, the memory structure 700 includes several data files, including a BAS data file 702, a vendor 1 data file 704, a vendor 2 data file 706, and a maintenance data file 708. Each data file is accessible by particular applications and/or users. Access to the data files is controlled by the control station 202 and/or a data server in the Internet gateway 212 or elsewhere.

As shown in FIG. 7, the data files are organized by the parties who access the information. As a consequence, sensor data received by the control station 202 may be stored in multiple data files corresponding to multiple parties. For example, sensor information regarding a lighting fixture or ballast may be stored in the building maintenance data file 708 for access by the building maintenance organization and in the vendor 2 data file 706, which may be accessible by a lighting fixture vendor.

The above system thus allows for various types of building data to be reported and made available to various authorized users.

Referring again generally to FIG. 2, the space communication hub 214 is a device that communicates with each of a number of devices that are located within a space of the building, and is further operably connected to the communication network 206. The space may be a room, a cubicle, a hallway, a floor, or a portion of a open floor plan area. The devices are device located in or in the proximity of the space and may include BAS sensors, actuators and controllers, as well as non-BAS sensors (and possibly other devices). In the embodiment of FIG. 2, the space communication hub 212 is operable to communicate with a temperature sensor 216, an air flow sensor 218, an actuator interface 220, n lighting sensors $222_1 \ldots 222_n$, a gas sensor 224, and equipment sensors 226 and 228. Together, the space communication hub 214, and the devices 216, 218, 220, $222_1 \ldots 222_n$, 224, 226 and 228 form a first space subsystem 250.

In the embodiment described herein, the space communication hub 212 is operable to communicate with the various devices 216, 218, 220, $222_1 \ldots 222_n$, 224, 226 and 228 using wireless communication protocols. By way of example, the space communication hub 212 may employ a Bluetooth communication module to effectuate wireless communications with the devices, and then include a conventional land-based communication interface circuit to communicate over the building network 206. Further details regarding an exemplary room communication hub that may be used as the room communication hub 212 is provided below in connection with FIG. 3. It will be appreciated that the room communication hub 212 may also suitably communicate with one or more devices, particularly BAS devices, using wired communications. To this end, it is noted that many BAS devices have existing wire infrastructures which may be used. The wireless communication capability of the room communication hub 212 would nevertheless open the door for the more comprehensive building data services.

The temperature sensor 216 in the embodiment described herein is a wireless temperature sensor that is operable to obtain a temperature reading of the first space and provide that information via wireless communications to the room communication hub 216. The wireless temperature sensor preferably includes a MEMs temperature sensor, and may suitably have the general architecture of the MEMs sensor module shown in FIG. 3 and discussed below. Other wireless MEMs-based sensor architectures may be used.

The air flow sensor 218 in the embodiment described herein is a wireless air flow sensor that is operable to obtain an air flow reading of a ventilation shaft or ventilation damper that provides heated or cooled air to the first space. The wireless air flow sensor is also preferably operable to provide the air flow information via wireless communications to the room communication hub 218. The wireless air flow sensor preferably includes a MEMs air flow sensor, and may suitably have the general architecture of the MEMs sensor device shown in FIGS. 2, 12a and/or 12b of U.S. patent application Ser. No. 10/672,527. Other wireless MEMs-based sensor architectures may be used.

The actuator controller 220 is an interface device that generates a signal for an actuator 221. The actuator 221 may suitably be any typical BAS actuator, such as a solenoid, stepper motor, linear actuator or the like. As is known in the art, BAS actuators may be used to open and close water valves, ventilation dampers, turn fan motors on or off, among other things. In the exemplary embodiment described herein, the actuator interface 220 includes a wireless communication circuit operable to receive actuator control information via the first space communication hub 214. The operations of the actuator interface may suitably have the general construction of the actuator module 362 of FIG. 3, discussed below.

As will be discussed below, the temperature sensor 216, the flow sensor 218 and the actuator controller 220 may be used to at least in part to maintain a desired temperature with the first space. This operation is a normal BAS operation of the HVAC system of the building, and is performed in conjunction with the control station 202 and mass data store 204.

In accordance with some embodiments of the invention, the room communication hub 214 also provides a data acquisition access point to various other sensors, including light fixture sensors $222_1 \ldots 222_N$.

Each lighting sensor $222_X$ is a device designed to detect a potential failure in a lighting ballast, for example, in a fluorescent lighting fixture. To this end, the lighting sensor is wireless sensor that includes a MEMs light sensing device that detects flickering light intensity as an indication that the ballast may be experiencing some problems. Alternatively, the lighting sensor may be a wireless sensor that includes a voltage sensor (MEMS or non-MEMS) that is coupled to the lighting ballast circuit to detect a fluctuating voltage signal indicative of a ballast problem. If the lighting fixture is malfunctioning, or requires a new ballast, the detected signal value after proper filtering will be out of range. Each lighting sensor $222_X$ also includes a wireless communication device and is operable to communicate the detected signal value to the space control communication hub 214 using wireless technology. To this end, each lighting sensor $222_X$ can have the general configuration of the MEMs-based sensor module 304 of FIG. 3, discussed below. However, the MEMs sensor in the device would include a MEMS light sensor as opposed to a MEMs temperature sensor or sensor suite.

The gas sensor 224 is a device designed to detect the significant presence of a noxious gas or an imbalanced mixture of normal atmospheric gasses. In the former case, the gas sensor 224 may be used in a laboratory setting to detect ammonia or other noxious by-product, or may be used to detect carbon monoxide. In the latter case, the sensor may detect an abnormal ratio of carbon dioxide to oxygen. To this end, the gas sensor is wireless sensor that includes a MEMs device that detects the selected gas, or may detect multiple gasses. The gas sensor 224 also includes a wireless communication device and is operable to communicate the any gas detection values to the space control communication hub 214 using wireless technology. To this end, the gas sensor 224 can have the general configuration of the MEMs-based sensor module 1200 of FIGS. 12a and 12b of U.S. patent application Ser. No. 10/672,527. Another suitable gas sensor is shown and described in U.S. patent application Ser. No. 10/951,450, which is incorporated herein by reference.

The equipment sensors 226 and 228 are devices designed to detect certain malfunctions or conditions in office and/or laboratory equipment. For example, one of the equipment sensors 226 or 228 may be a MEMs-based wireless temperature sensor for a soda machine, or photocopy device. The equipment sensor 226, 228 could provide temperature sensor periodically or only when an out-of-bounds condition is detected. In another example, a MEMs pressure sensor could be arranged to detect when a toner-cartridge of a printer or photocopier is nearly empty (based on weight). The equipment sensor may instead be a non-MEMs based circuit that reads service or usage related data from a processor board of the equipment. In any event, the equipment sensors 226 preferably include the requisite sensor and/or digital communication interface, and further include a wireless communication device. The wireless communication device allows the equipment sensor 226 and/or 228 to communicate the equipment-related information to the space control communication hub 214 using wireless technology.

In operation, the temperature sensor 216, the flow sensor 218 and the actuator controller 220 are used for normal HVAC operations. To this end, the actuator 221 is a ventilation damper actuator that controls the amount of cooled air entering the first space. A controller device, not shown, but which is known in the art, would provide signals to the actuator controller 220 to further open or further close the ventilation damper based on information from the temperature sensor 216. For example, if the temperature information from the temperature sensor 216 indicates that the temperature in the space is higher than a desired, or set point, temperature, then the controller would send a signal to the actuator interface 220 that causes the actuator 221 to further open the ventilation damper, thereby letting more cool air into the room. If, however, the temperature information indicates that the temperature in the first space is lower than the set point temperature, then the controller would send a signal to the actuator interface 220 that causes the actuator 221 to further close the ventilation damper, thereby restricting the flow of cool air. In such a case, the flow sensor 218 may be used to monitor the air flow through the ventilation damper to determine if the flow from a remote source of cool air must be increased or decreased.

Such operations of an HVAC system are well known. The controller element that determines whether to open or close the ventilation damper may be located at the first space communication hub 214, in the actuator interface 220, or even in the temperature sensor 216. The set point or desired temperature for the space may be entered into the control station 202 by an operator. The control station 202 would thereafter communicate the desired set point temperature to the controller element via the communication network 206 and the room communication hub 214.

The control station 202 also executes other applications that require information from the temperature sensor 216 and/or the air flow sensor 218. For example, the control station 202 operates as a data server that obtains such information for display to a technician, or for archiving trends and the like the mass data store 204. In some embodiments, HVAC data such as the measurements from the temperature sensor 216 and/or air flow sensor 218 is made available over the Internet. Accordingly, the control station 202 can obtain temperature and/or air flow data via the room communication hub 214 and the communication network 206. The control station 202 then makes the information available on a local display, stores it (or other data derived from it) in the mass data store 204, and/or makes the data available to the Internet gateway 212 using the communication network 206. To this end, the temperature sensor 216 uses its wireless communications device to communicate the measured temperature data to the room communication hub 214. The room communication hub 214 then uses the communication network 206 to communicate the information to the control station 202. The air flow sensor 218 communicates air flow measurement information to the control station 202 in the same manner.

The control station 202 may suitably store received HVAC information, either in its original form or further processed, in a portion of the data store 204 accessible only to authorized BAS service providers such the BAS service provider 104 of FIG. 1. To this end, the control station 202 would store HVAC information in the BAS data file 702 of FIG. 7.

In a similar manner, the lighting sensors $222_1 \ldots 222_N$ all communicate measurement data to the control station via the room communication hub 214 and the communication network 206. The control station 202 may then store the lighting information locally or in the mass data store 204, or displays alarms if the information indicates that one or more lighting fixtures requires maintenance. The control station 202 may also communicate the information to another server, not shown, that is under the control of the maintenance organization. That other server may be connected (directly or indirectly) to the communication network 206 or may be instead be connected via the Internet.

In a normal operation, the lighting information, or information derived from the lighting information, is stored in the data store 204 or elsewhere in a data file or structure that is logically configured to afford access to the maintenance organization, such as the Vendor 1 data file 704 shown in FIG. 7. The maintenance organization is typically located on-site, but may also be located off-site. In one exemplary operation, the maintenance organization uses the Internet to obtain the lighting-related information. To this end, the control station 202 stores lighting-related information locally or in the mass data store 204, and then provides the information upon a polling request from an authorized user. The polling request may be received through the Internet gateway 212 and the communication network 206. The control station 202 determines if the user is authorized to access the lighting-related data. If so, then the control station 202 retrieves the requested data from storage and provides it to the requesting user via the Internet gateway 212.

Alternatively, an on-site maintenance organization may obtain this information using local data servers.

Similar to the lighting sensors $222_1 \ldots 222_N$, each of the equipment sensors 226, 228 also communicates measurement data or other service or operational data to the control station 202 via the room communication hub 214 and the communication network 206. The equipment sensor data is typically provided to an equipment service provider either on-site or off-site. In one exemplary operation, the control station 202 stores equipment related information locally or in the mass data store 204, and then provides the information upon a polling request from an authorized user. As with the lighting information discussed above, the polling request may be received through the Internet gateway 212 and the communication network 206. The control station 202 determines if the user is authorized to receive the data, and if so, retrieves the requested data from storage and provides it to the requesting user via the Internet gateway 212.

As discussed above, the data generated by each sensor is protected so that it may only be accessed by authorized users. Thus, for example, the photocopier service company can only access data obtained from sensors in the photocopiers (e.g. equipment sensor 226), the vending machine company can only access data obtained from the soda machine sensors (e.g. equipment sensor 228), and the maintenance organization can only obtain data from sensors on lighting fixtures, water fountains, furniture or other elements under its control. It may be advantageous for the BAS service provider 104 of FIG. 1 to obtain compensation (value) in exchange for gathering and storing data for each of the non-BAS vendors. The compensation would obtain for each Vendor limited use of the BAS infrastructure (e.g. control station 202, data storage 204, communication network 206 and hubs 214 and/or 230) in order to obtain and store (within structure 700 of FIG. 7) data important to that vendor.

One advantage of the above embodiment is that it takes advantage of the existing BAS infrastructure, and combines that with small wireless sensor technology to create access to operational data in almost any possible building aspect. In the past, wiring, size and power considerations would have made sensors of this type inconceivable.

The gas sensor 224 information may be implemented as part of the life safety system of the building, which is one of the traditional BAS services. The life safety system includes fire-related safety equipment such as heat/smoke detectors, pull stations, elevator override circuits, alarms and the like.

The second space communication hub 230 is located in another space of the building, and also provides a wireless communication hub to a plurality of sensor devices 232, 234, and 236. The second space communication hub 230 and the sensor devices 232, 234 and 236 cooperate to form a second space subsystem 252.

As with the first space communication hub 214, the second space communication hub 230 is connected to and communicates information with the control station 202 and/or other elements on the communication network 206. The sensor devices 232, 234 and 236 may suitably include HVAC or other BAS devices as well as non-BAS devices related to building maintenance, vendor equipment, or other elements.

The building preferably includes several space subsystems with communication hubs similar to hubs 214, 230. The wiring of the communication network 206 to the various hubs is already necessary to effect the BAS services such as HVAC services, life/fire safety services, and/or security services.

Figure 3:
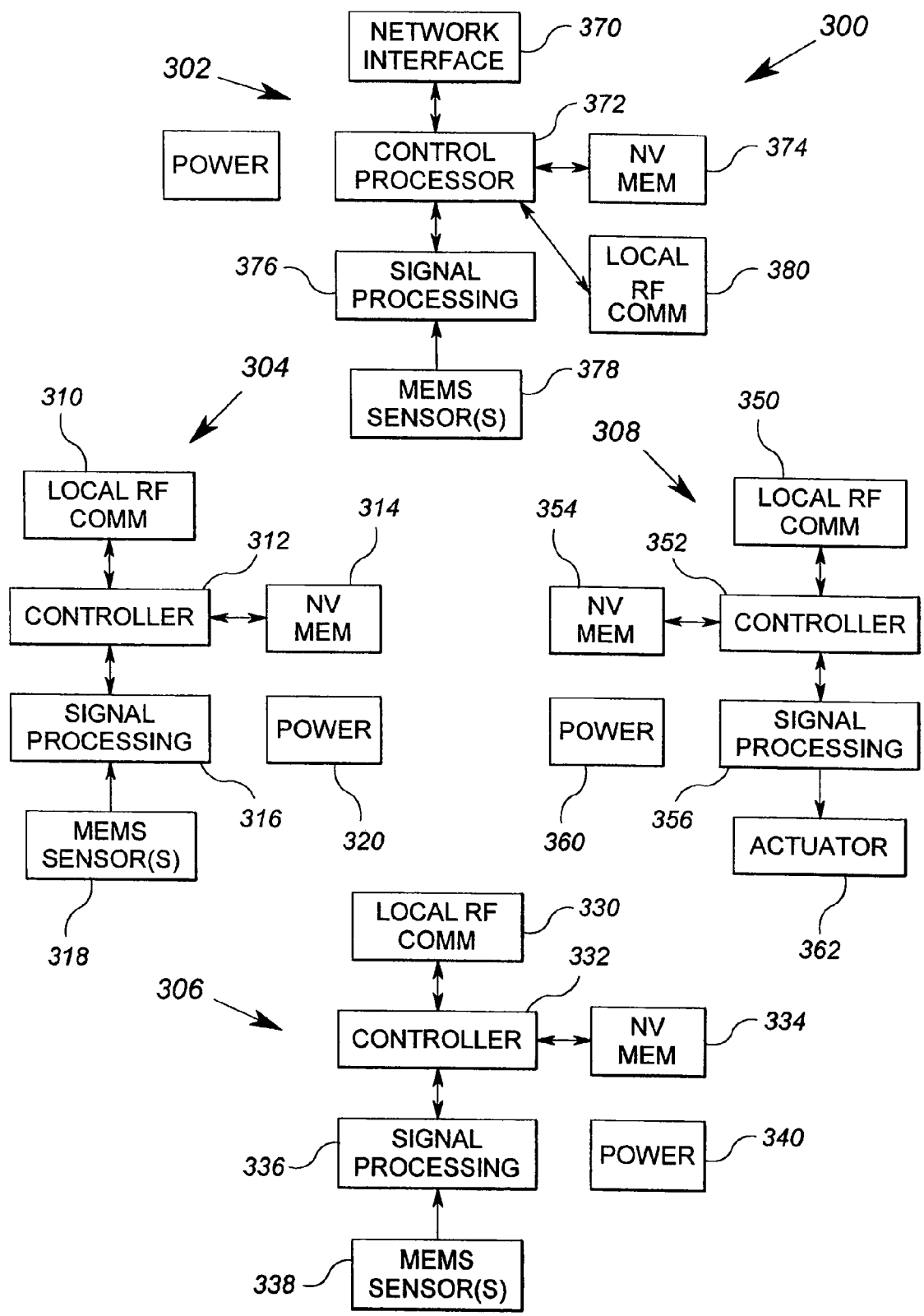
FIG. 3 shows a block diagram of an example of a space subsystem of the system of FIG. 1.

FIG. 3 shows and example of a space system 300 such as the space systems 250, 252 of FIG. 2. In the example of FIG. 3, the space system 300 includes a hub module 302, first and second sensor modules 304 and 306, respectively, and an actuator module 308. The first sensor 304 is configured to obtain ambient space temperature information that is used to regulate the temperature in the space. The second sensor 306 is configured to obtain temperature information attached to an element of a photocopier machine that is used by the photocopier service provider to detect potential malfunctions evidenced by overheating in that element. The actuator module 308 is configured to open or close a ventilation damper to increase or decrease the flow of cool air into the space.

It will be appreciated that a particular space system 300 may contain more or less sensor modules or actuator modules, as is illustrated in FIG. 2, discussed above. In the exemplary embodiment described herein, the space system 300 is operable to assist in regulating the temperature within a room or space pursuant to a set point value, and is further operable to communicate HVAC data and photocopier equipment sensor data to and from the BAS infrastructure.

The first sensor module 304 represents a temperature sensor module and is preferably embodied as a wireless integrated network sensor that incorporates microelectromechanical system technology ("MEMS"). By way of example, in the exemplary embodiment described herein, the first sensor module 304 includes a MEMS local RF communication circuit 310, a microcontroller 312, a programmable non-volatile memory 314, a signal processing circuit 316, and one or more MEMS sensor devices 318. The first sensor module 304 also contains a power supply/source 320. In the preferred embodiment described herein, the power supply/source 320 is a battery, for example, a coin cell battery.

Examples of MEMS circuits suitable for implementing the first sensor module 204 are described in the ESSCIRC98 Presentation "Wireless Integrated Network Sensors (WINS)", which is published on-line at www.janet.ucla.edu/WINS/archives, (hereinafter referred to as the "WINS Presentation"), and which is incorporated herein by reference. Another suitable implementation is taught in U.S. Pat. No. 6,471,853 to Moscaritolo, issued Oct. 29, 2002, which is incorporated herein by reference. Yet another suitable MEMS sensor element is taught in U.S. patent application Ser. No. 10/951,450

The MEMS sensor device(s) 318 include at least one MEMS sensor, which may suitably be a temperature sensor, flow sensor, pressure sensor, and/or gas-specific sensor. MEMS devices capable of obtaining temperature, flow, pressure and gas content readings have been developed and are known in the art. In one embodiment, several sensors are incorporated into a single device as a sensor suite 318. Upon installation, the sensor module 304 may be programmed to enable the particular sensing capability. By incorporating different, selectable sensor capabilities, a single sensor module design may be manufactured for use in a large majority of HVAC sensing applications, and possibly some non-BAS oriented applications. In the embodiment of FIG. 3, the sensor module 304 is configured to enable its temperature sensing function.

The signal processing circuit 316 includes the circuitry that interfaces with the sensor, converts analog sensor signals to digital signals, and provides the digital signals to the microcontroller 312. Examples of low power, micro-electronic A/D converters and sensor interface circuitry are shown in the WINS Presentation.

The programmable non-volatile memory 314, which may be embodied as a flash programmable EEPROM, stores configuration information for the sensor module 304. By way of example, programmable non-volatile memory 314 preferably includes system identification information, which is used to associate the information generated by the sensor module 304 with its physical and/or logical location in the building control system. For example, the programmable non-volatile memory 314 may contain an "address" or "ID" of the sensor module 304 that is appended to any communications generated by the sensor module 304.

The memory 314 further includes set-up configuration information related to the type of sensor being used. For example, if the sensor device(s) 318 are implemented as a suite of sensor devices, the memory 314 includes the information that identifies which sensor functionality to enable. The memory 314 may further include calibration information regarding the sensor, and system RF communication parameters employed by the microcontroller 312 and/or RF communication circuit 310 to transmit information to other devices.

The microcontroller 312 is a processing circuit operable to control the general operation of the sensor module 304. In general, however, the microcontroller 312 receives digital sensor information from the signal processing circuit 316 and provides the information to the local RF communication circuit 310 for transmission to a local device, for example, the hub module 302. The microcontroller 312 may cause the transmission of sensor data from time-to-time as dictated by an internal counter or clock, or in response to a request received from the hub module 302.

The microcontroller 312 is further operable to receive configuration information via the RF communication circuit 310, store configuration information in the memory 314, and perform operations in accordance with such configuration information. As discussed above, the configuration information may define which of multiple possible sensor functionalities is to be provided by the sensor module 304. The microcontroller 312 employs such information to cause the appropriate sensor device or devices from the sensor device suite 318 to be operably connected to the signal processing circuit such that sensed signals from the appropriate sensor device are digitized and provided to the microcontroller 312. As discussed above, the microcontroller 312 may also use the configuration information to format outgoing messages and/or control operation of the RF communication circuit 310.

The MEMS local RF communication circuit 310 may suitably include a Bluetooth RF modem, or some other type of short range (about 30-100 feet) RF communication modem. The use of a MEMS-based RF communication circuit 310 allows for reduced power consumption, thereby enabling the potential use of a true wireless, battery operated sensor module 304. A suitable exemplary MEMS-based RF communication circuit is discussed in the WINS Presentation.

As discussed above, it is assumed that the sensor module 304 is configured to operate as a temperature sensor. To this end, the memory 314 stores information identifying that the sensor module 304 is to operate as a temperature sensor. Such information may be programmed into the memory 314 via a wireless programmer. The module 304 may be programmed upon shipment from the factory, or upon installation into the building control system. The microcontroller 312, responsive to the configuration information, causes the signal processing circuit 316 to process signals only from the temperature sensor, ignoring output from other sensors of the sensor suite 318.

It will be appreciated that in other embodiments, the sensor suite 318 may be replaced by a single sensor. However, additional advantages may be realized through the use of a configurable sensor module capable of performing any of a plurality of sensor functions. As discussed further above, these advantages include the reduction of the number of sensor module designs.

In addition, the reduced wiring requirements and the reduced power consumption of the above described design provides benefits even in non-battery operated sensors.

The sensor module 306 is configured to operate as a temperature sensor in the embodiment described herein. The sensor module 306 may suitably have the same physical construction as the sensor module 304. However, because the sensor module 306 is configured to detect temperatures in the inside of a photocopy machine that can be much higher than ambient room temperatures, the sensor module 306 may include different MEMs sensor technology configured to measure higher temperatures with greater accuracy.

To this end, the sensor module 306 includes a local RF communication circuit 330, a microcontroller 332, a programmable non-volatile memory 334, a signal processing circuit 336, a temperature sensor 338, and a power supply/source 340. Similar to the sensor module 304, the memory 334 of the sensor module 306 contains configuration information for the sensor module 306. The temperature sensor 338 may suitably be a MEMs temperature sensor configured to measure temperatures in the operating temperature range of the photocopier element on which it is implemented.

As discussed above in connection with FIG. 2, sensor modules such as the sensor modules 304 and 306 may be configured for other implementations that measure other aspects of office equipment, laboratory equipment, or building architectural features. In such cases, the sensor module 306 may suitably be the same except that it implements a different MEMs sensor (or even a digital data interface circuit).

Referring again to the embodiment of FIG. 3, the actuator module 308 is a device that is operable to cause movement or actuation of a physical device that has the ability to change a parameter of the building environment. For example, the actuator module 308 in the embodiment described herein is operable to control the position of a ventilation damper, thereby controlling the flow of heated or chilled air into the room.

The actuator module 308 is also preferably embodied as a wireless integrated network device that incorporates microelectromechanical system ("MEMS") devices. By way of example, in the exemplary embodiment described herein, the actuator module 308 includes a MEMS local RF communication circuit 350, a microcontroller 352, a programmable non-volatile memory 354, and a signal processing circuit 356. The actuator module 308 also contains a power supply/source 360. In the preferred embodiment described herein, the power supply/source 360 is a battery, for example, a coin cell battery. However, it will be appreciated that if AC power is necessary for the actuator device (i.e. the damper actuator), which may be solenoid or value, then AC power is readily available for the power supply/source 360. As a consequence, the use of battery power is not necessarily advantageous.

The actuator 362 itself may suitably be a solenoid, stepper motor, or other electrically controllable device that drives a mechanical HVAC element. In the exemplary embodiment described herein, the actuator 362 is a stepper motor for controlling the position of a ventilation damper.

The MEMS local RF communication circuit 350 may suitably be of similar construction and operation as the MEMS local RF communication circuit 310. Indeed, even if the MEMS local RF communication circuit 350 differs from the RF communication circuit 310, it nevertheless should employ the same communication scheme.

The microcontroller 352 is configured to receive control data messages via the RF communication circuit 350. In the embodiment described herein, the control data messages are generated and transmitted by the hub module 302. The control data messages typically include a control output value intended to control the operation of the actuator 362. Accordingly, the microcontroller 352 is operable to obtain the control output value from a received message and provide the control output value to the signal processing circuit 356. The signal processing circuit 356 is a circuit that is configured to generate an analog control signal from the digital control output value. In other words, the signal processing circuit 356 operates as an analog driver circuit. The signal processing circuit 356 includes an output 358 for providing the analog control signal to the actuator 362.

The non-volatile memory 354 is a memory that contains configuration and/or calibration information related to the implementation of the actuator 362. The memory 354 may suitably contain sufficient information to effect mapping between the control variables used by the hub module 302 and the control signals expected by the actuator 362. For example, the control variables used by the hub module 302 may be digital values representative of a desired damper position charge. The actuator 362, however, may expect an analog voltage that represents an amount to rotate a stepper motor. The memory 354 includes information used to map the digital values to the expected analog voltages.

The hub module 302 operates the space communication hub of the space system 300, and thus communicates with the various devices of the space system 300 and further communicates with the BAS infrastructure, for example, the control station 202 and other devices connected to the communication network 206 of FIG. 2. Thus, the hub module 302 may receive temperature sensor information from either the space temperature sensor module 304 or the photocopier element sensor module 306 and communicate the information to a control station or the like, where it may be accessed by one or more authorized users.

The hub module 302 in the exemplary embodiment described herein also performs the function of the loop controller (e.g. a PID controller) for the space system 300. In particular, the hub module 302 obtains process variable values (i.e. sensor information) from the sensor modules 304 and generates control output values. The hub module 302 provides the control output values to the actuator module 308.

In the exemplary embodiment described herein, the hub module 302 further includes sensor functionality. In general, it is often advantageous to combine the hub controller core functionality with a sensor function to reduce the overall number of devices in the system. Thus, some space systems could include a hub module 302 with an integrated temperature sensor and one or more actuator modules. In such a case, a separate room space sensor module such as the sensor module 304 would not be necessary.

To accomplish these and other functions, the hub module 302 includes a network interface 370, a room control processor 372, a non-volatile memory 374, a signal processing circuit 376, a MEMS sensor suite 378 and a MEMS local RF communication circuit 380.

The network interface 370 is a communication circuit that effectuates communication to one or more components of the building control system that are not a part of the space system 300. Referring to FIG. 2, the network interface 370 is the device that allows the space system 300 to communicate with the supervisory computer control station 202 as well as the other space systems such as the one that includes the space communication hubs 214 and 230.

Referring again to FIG. 3, the space communication hub 302 may employ wireless communications to connect to the infrastructure, such as is discussed in connection with FIGS. 1 and 2 of U.S. patent application Ser. No. 10/672,527, which is owned by the assignee of the present application and incorporated herein by reference. In such a case, the network interface 370 could suitably be an RF modem configured to communicate using the wireless area network communication scheme.

In the embodiment described herein, however, the communication network 206 (see FIG. 2) includes an Ethernet or similar network protocol. Accordingly, the network interface 370 is an Ethernet transceiver.

As discussed above, the hub module 302 may optionally include sensor capability. To this end, the MEMS sensor suite 378 may suitably include a plurality of MEMS sensors, for example, a temperature sensor, flow sensor, pressure sensor, and/or gas-specific sensor. As with the sensor module 304, the hub module 302 may be programmed to enable the particular desired sensing capability. In this manner, a single hub module design may be manufactured to for use in a variety of HVAC sensing applications, each hub module 302 thereafter being configured to its particular use. (See e.g. FIGS. 4 and 5). However, it may be sufficient to provide hub control modules having only temperature sensing capability because rooms that employ an HVAC controller also typically require a temperature sensor. Thus, a temperature sensor on the hub module will nearly always fill a sensing need when the hub module is employed.

The signal processing circuit 376 includes the circuitry that interfaces with the sensor suite 378, converts analog sensor signals to digital signals, and provides the digital signals to the room control processor 372. As discussed above, examples of low power, micro-electronic A/D converters and sensor interface circuitry are shown in the WINS Presentation.

The programmable non-volatile memory 374, which may be embodied as a flash programmable EEPROM, stores configuration information for the hub module 374. By way of example, programmable non-volatile memory 374 preferably includes system identification information, which is used to associate the information generated by the sensor module 374 with its physical and/or logical location in the building control system. The memory 374 further includes set-up configuration information related to the type of sensor being used. The memory 374 may further include calibration information regarding the sensor, and system RF communication parameters employed by the control processor 372, the network interface 370 and/or the local RF communication circuit 380.

The MEMS local RF communication circuit 380 may suitably include a Bluetooth RF modem, or some other type of short range (about 30-100 feet) RF communication modem. The MEMS local RF communication circuit 380 is operable to communicate using the same RF communication scheme as the MEMS local RF communication circuits 310, 330 and 350. As with the sensor module 304, the use of a MEMS-based RF communication circuit allows for reduced power consumption, thereby enabling the potential use of a true wireless, battery operated hub module 302. A suitable MEMS-based RF communication circuit is discussed in the WINS Presentation.

The control processor 372 is a processing circuit operable to control the general operation of the hub module 302. In addition, the control processor 372 implements a control transfer function to generate control output values that are provided to the actuator module 308 in the space system 300. To this end, the control processor 372 obtains sensor information from its own sensor suite 378 and/or from sensor module 304. The control processor 372 also receives a set point value, for example, from the supervisory computer 202 via the network interface 370. The control processor 372 then generates the control output value based on the set point value and one or more sensor values. The control processor 372 may suitably implement a proportional-integral-differential (PID) control algorithm to generate the control output values. Suitable control algorithms that generate control output values based on sensor or process values and set point values are known.

It will be appreciated that the sensor functionality and control functionality in the hub module 302 is optional. At a minimum, a hub module for a space subsystem such as the subsystems 250 and 252 of FIG. 2 should include the network interface 370 and the local RF communication circuit 380, as well as supporting circuitry therefore.

Figure 4:
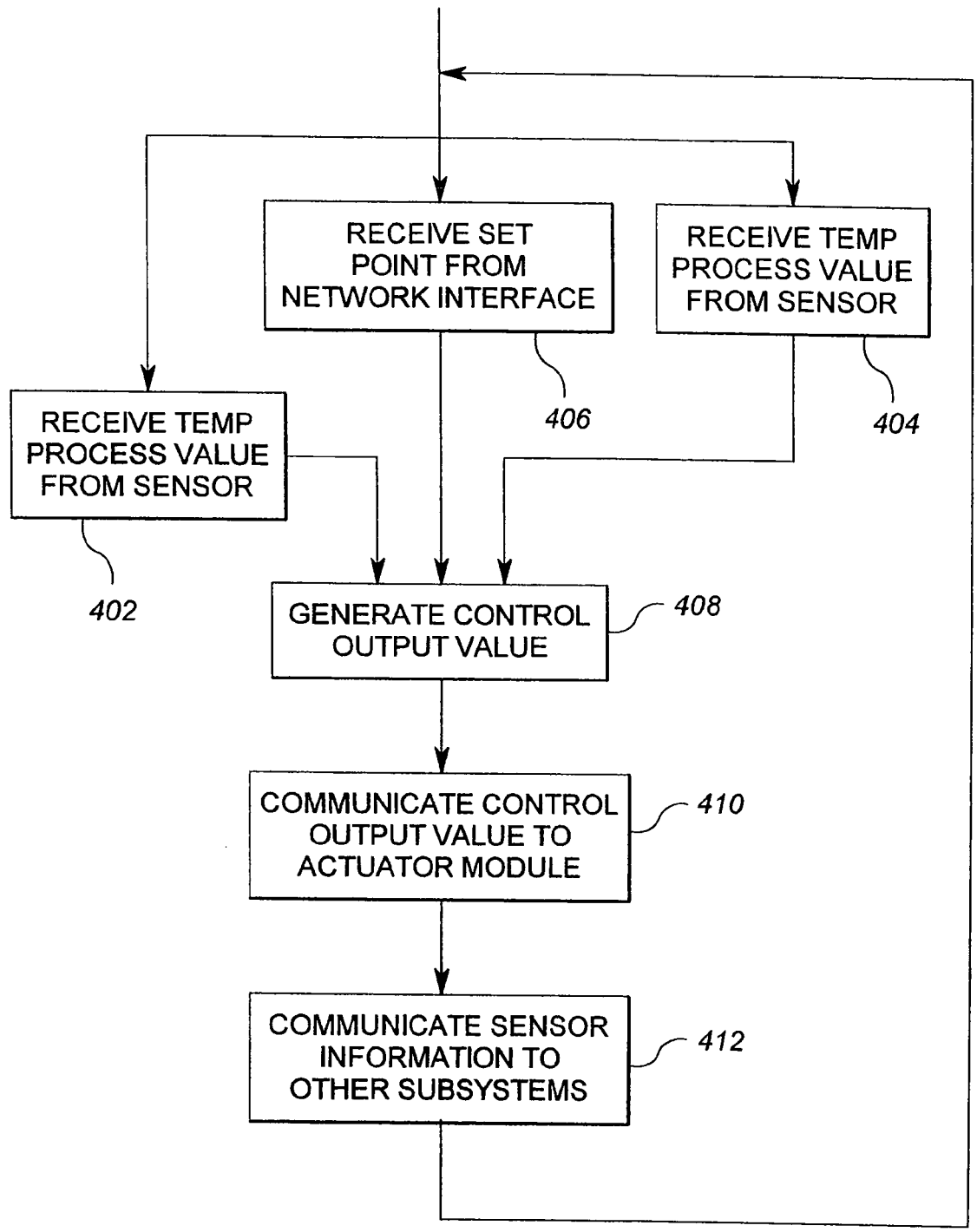
FIG. 4 shows an exemplary set of operations performed by a hub of the space subsystem of FIG. 3.
Figure 5:
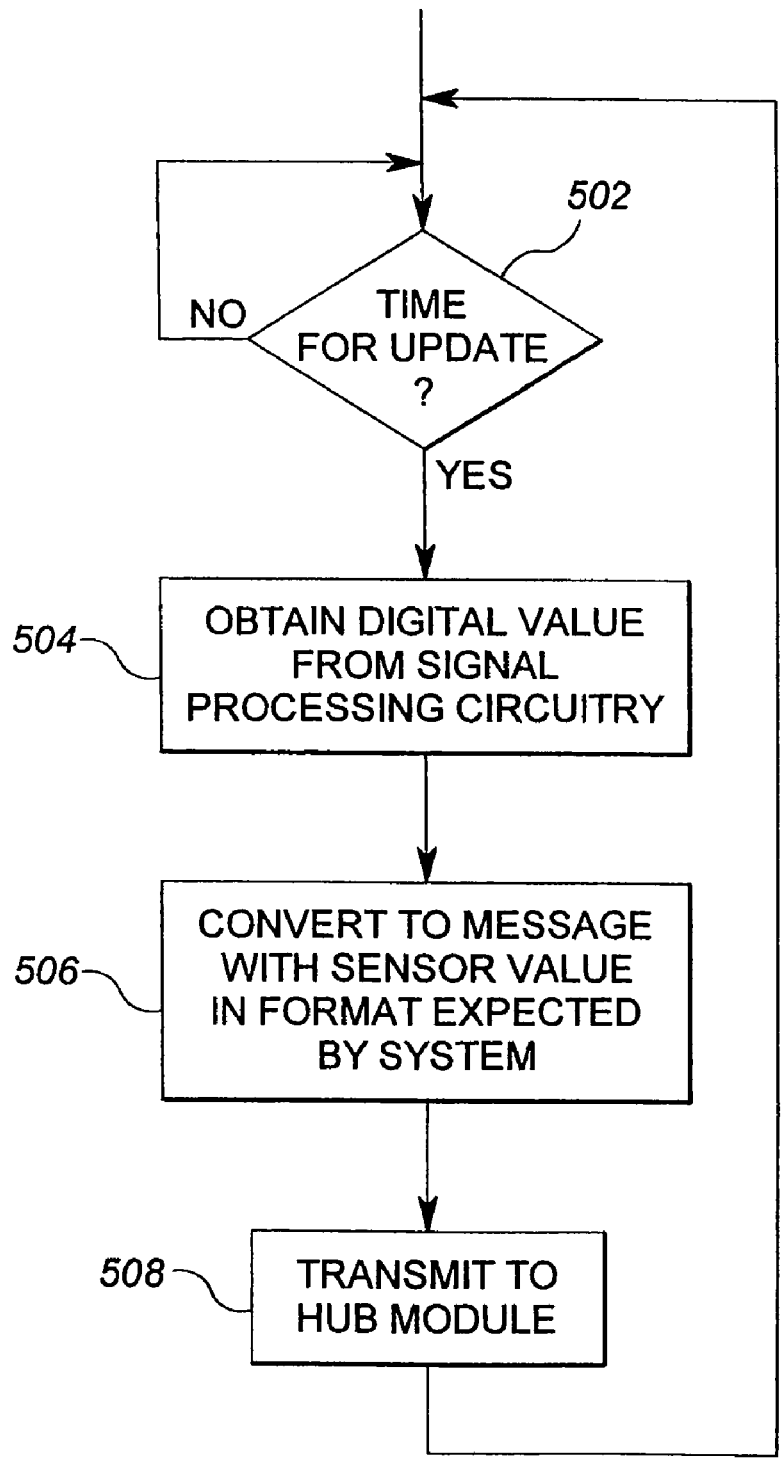
FIG. 5 shows an exemplary set of operations performed by a sensor module of the space subsystem of FIG. 3.
Figure 6:
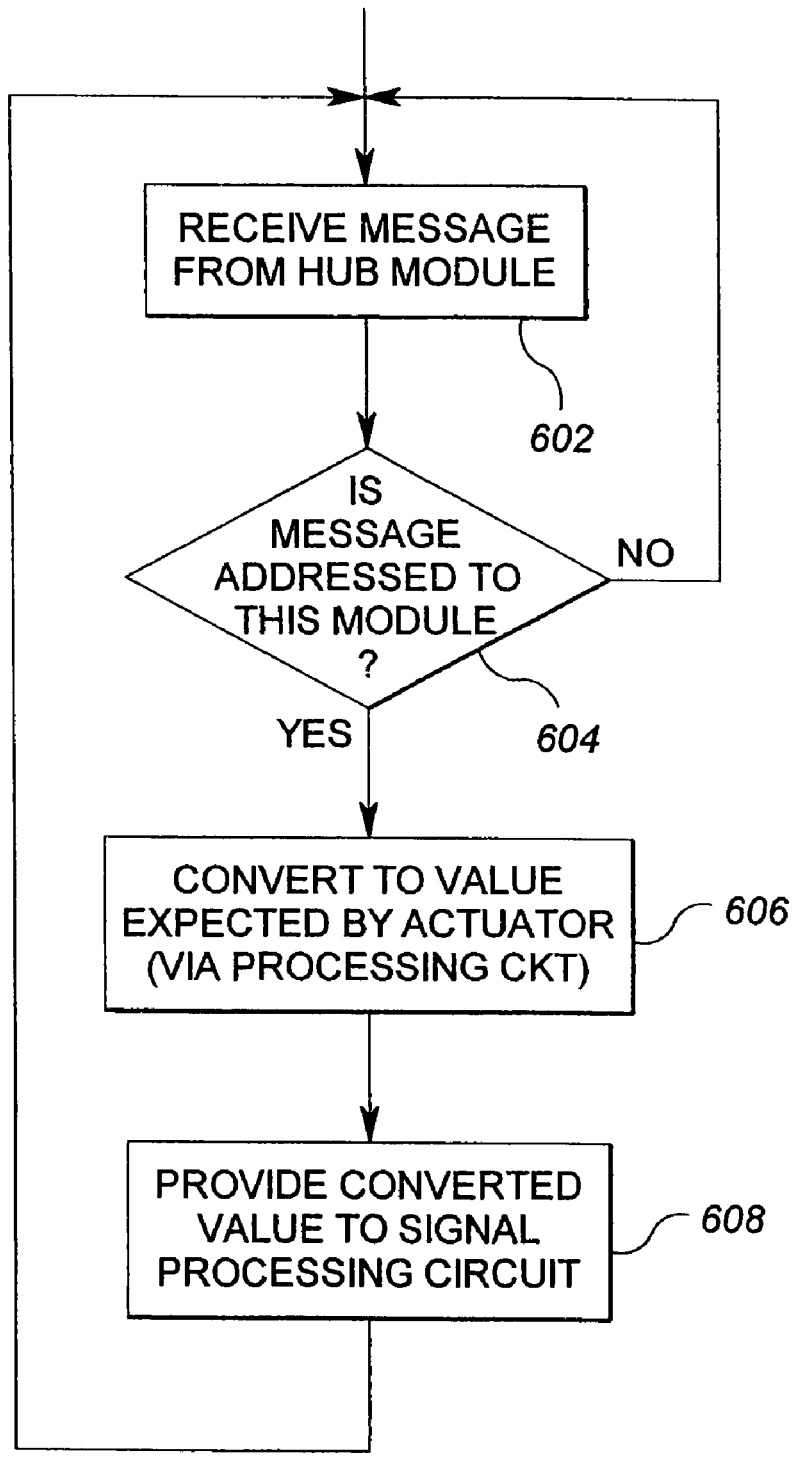
FIG. 6 shows an exemplary set of operations performed by an actuator module of the space subsystem of FIG. 3.

Exemplary sets of operations of the space system 300 is shown in FIGS. 4, 5 and 6. In general, FIGS. 4, 5 and 6 illustrate how the hub module 302, the sensor module 304 and actuator 308 operate to attempt to control aspects of the environment of the room. FIGS. 4 and 5 further illustrate how the hub module 302 and the sensor module 306 obtain and relay non-BAS sensor information to the BAS infrastructure. More particularly, FIG. 4 shows an exemplary set of operations of the hub module 302, FIG. 5 shows an exemplary set of operations of the sensor module 304, and FIG. 6 shows an exemplary set of operations of the actuator module 308.

Referring particularly to FIG. 4, the operations shown therein will be described with contemporaneous reference to FIG. 3. The operations of FIG. 4 are performed by the room control processor 372, which generally controls the operation of the hub module 302.

Steps 402, 404 and 406 all represent operations in which the room control processor 372 receives input values from various sources. The order in which those steps are performed is not of critical importance.

In step 402, the processor 372 receives a temperature value from the sensor module 306, which in the exemplary embodiment described herein is a photocopier element temperature sensor. To receive a temperature value from the sensor module 306, the processor 372 causes the local RF communication circuit 380 to be configured to receive a transmitted message from the local RF communication circuit 330 of the sensor module 306. When a message is received, the local RF communication circuit 380 and/or the processor 378 verify the source and intended destination of the message. If the message is legitimately intended for the hub module 302, then the processor 378 parses the sensor value from the message for subsequent use.

In step 404, the processor 372 receives space temperature measurement values from the sensor module 304 as well as its internal temperature sensor device 378. In many cases, only a single space temperature sensor value is necessary, in which case the hub module 302 need not include the temperature sensor 378, or, alternatively, the separate sensor module 304 would not be necessary. In the exemplary embodiment described herein, however, it will be assumed that the processor 372 receives room or space temperature values from both the temperature sensor device 378 and the sensor module 304. To receive a temperature value from the sensor module 304, the processor 372 and local RF communication circuit 380 operate in the same manner as that described above in connection with receiving sensor values from the sensor module 306. To receive a temperature value from the sensor 378, the processor 372 receives digital sensor information from the signal processing circuit 376.

In step 406, the processor 372 obtains a set point value through the network interface 370. In particular, in the embodiment described herein, the set point temperature for the room in which the space system 300 is disposed is provided from a device external to the space system 300. For example, the control station 202 of FIG. 2 may provide the temperature set points for the space subsystems 250, 252 (among others) in the building control system 100. It will be noted, however, that in alternative embodiments, the set point may be derived from a manually-adjustable mechanism directly connected to the hub module 202.

To receive the set point value from the external device, the network interface 370 monitors the BAS infrastructure communication network, such as the communication network 206 of FIG. 2. If a message including a set point intended for the space system 300 is received by the network interface 370, then that message will be provided to the processor 372. In such a case, the processor 372 parses the set point information for subsequent use, such as use in the execution of step 408, discussed below.

In step 408, the processor 372 generates a control output value based on the most recently received set point value and temperature sensor values. To this end, the processor 372 may suitably employ a PID control algorithm to generate the control output value. In the embodiment described herein, the control output value is representative of a desired change in a vent damper position. For example, if chilled air is provided through the vent, and the sensor temperature value exceeds the set point temperature value, then the control output value identifies that the vent damper must be opened further. Further opening the vent damper allows more chilled air to enter the room, thereby reducing the temperature.

A PID control algorithm that is capable of generating a vent damper position based on a difference between temperature sensor values and a set point temperature value would be known to one of ordinary skill in the art. In general, it will be noted that the use of particular control system elements such as temperature sensors, set point temperatures, and vent dampers are given by way of illustrative example. The use of control systems and subsystems with reduced wiring as generally described herein may be implemented in control systems implementing a variety of sensor devices and actuators or other controlled devices.

Referring again to the specific embodiment described herein, it will be appreciated that during ongoing operation, the processor 372 does not require an update in each of steps 402, 404 and 406 prior to performing step 408. Any update received in any of those steps can justify a recalculation of the control output value. Moreover, the processor 372 may recalculate the control output value on a scheduled basis, without regard as to which input values have changed.

In step 410, the processor 372 causes the generated control output value to be communicated to the actuator module 308. To this end, the processor 372 and the local RF communication circuit 380 cooperate to generate a local RF signal that contains information representative of the control output value. The processor 372 may suitably add a destination address representative of the actuator module 308 to enable the actuator module 308 to identify the message.

It is noted that in the exemplary embodiment described herein, the temperature sensor value received from the photocopier element temperature sensor module 306 is not used in the PID control calculation performed by the processor 272, nor in any BAS operation. That value is obtained so that it may be used by an authorized user such as an equipment vendor and/or service vendor. To this end, the temperature sensor value is passed on to the control station 202. Both BAS and non-BAS information is typically communicated to the control station 202 and/or other systems within the building system 200 of FIG. 2.

To this end, in step 412, the processor 372 causes the network interface 370 to transmit received sensor values to devices external to the room control subsystem 300. For example, the processor 372 may cause temperature and other sensor values to be transmitted to the control station 202. The control station 202 may then store or utilize the information according to the information type. For example, the control station 202 may use space temperature information obtained from the sensor module 304 to monitor the operation of the BAS, and/or to control other BAS elements such as chilling plants or blowers, not shown, to operate more efficiently. The control station 202 may store non-BAS information in a storage device in segments that may be separate accessed by different authorized users, such as that described above in connection with FIGS. 2 and 7.

Referring again to FIG. 4, the room control processor 372 repeats steps 402-412 on a continuous basis. As discussed above, the steps 402-412 need not be performed in any particular order. New sensor and/or set point values may be received periodically either on a schedule, or in response to requests generated by the processor 372.

With regard to the sensor values, FIG. 5 shows an exemplary set of operations performed by the sensor module 304 in generating and transmitting temperature sensor values to the hub module 302 in accordance with step 402 of FIG. 4. The sensor module 306 may suitably perform a similar set of operations to generate and transmit photocopier element temperature sensor values to the hub module 302 in accordance with step 404 of FIG. 4. Moreover, a sensor measuring an aspect or measurement of any building device may suitably perform similar operations.

Referring now to FIG. 5, the operations shown therein are performed by the microcontroller 312 of the sensor module 304. In step 502, the microcontroller 312 determines whether it is time to transmit an updated temperature value to the hub module 302. The determination of when to transmit temperature values may be driven by a clock internal to the sensor module 304, or in response to a request or query received from the hub module 302, or both. In either event, if it is not time to transmit an update, the microcontroller 312 repeats step 502.

If, however, it is determined that an update should be transmitted, then the microcontroller 312 proceeds to step 504. In step 504, the microcontroller 312 obtains a digital value representative of a measured temperature from the signal processing circuit 316. To this end, the microcontroller 312 preferably "wakes up" from a power saving mode. The microcontroller 312 preferably also causes bias power to be connected to power consuming circuits in the signal processing circuit 316, such as the A/D converter. In this manner, power may be conserved by only activating power consuming circuits when a temperature sensor value is specifically required. Otherwise, the power consuming devices remain deactivated. Thus, for example, if a temperature value need only be updated every fifteen seconds, many of the power consuming circuits would only be energized once every fifteen seconds. However, it is noted that if the power source 320 is derived from AC building power, the need to reduce power consumption is reduced, and the microcontroller 312 and the signal processing circuit 316 may receive and process digital temperature sensing values on an ongoing basis.

In any event, after step 504, the microcontroller 312 proceeds to step 506. In step 506, the microcontroller 312 converts the sensed digital temperature value into the format expected by the room control processor 372 of the hub module 302. The microcontroller 312 further prepares the message for transmission by the local RF communication circuit 310. Once the message including the sensor temperature value is prepared, the microcontroller 312 in step 508 causes the local RF communication circuit 310 to transmit the message. The message is thereafter received by the hub module 302 (see step 404 of FIG. 3). Thereafter, the microcontroller 312 may return to step 502 to determine the next time an update is required.

FIG. 6 shows an exemplary set of operations that may be performed by the microcontroller 352 of the actuator module 308. As discussed above, one purpose of the space system 300 is to control the physical operation of a BAS device to help regulate an HVAC system condition, in this case, the room temperature. The actuator module 308 thus operates to carry out the actions determined to be necessary in accordance with the control algorithm implemented by the room process controller 372.

First, in step 602, a message which may include the control output value is received from the hub module 302. To this end, the RF communication circuit 350 receives the message and provides the message to the microcontroller 352. Thereafter, in step 604, the microcontroller 352 determines whether the received message is intended for receipt by the actuator module 308. If not, then the microcontroller 352 returns to step 602 to await another incoming message.

If, however, the microcontroller 352 determines in step 604 that the received message is intended for the actuator module 308, then the microcontroller 352 proceeds to step 606. In step 606, the microcontroller 352 parses the message to obtain the actuator control output value, and converts that value into a value that will cause the actuator to perform the requested adjustment. For example, if the received control output value identifies that the ventilator damper should be opened another 10%, then the microcontroller 352 would generate a digital output value that, after being converted to analog in the signal processing circuit 356, will cause the actuator 358 to open the ventilator damper another 10%.

In step 608, the microcontroller 352 actually provides the digital output value to the signal processing circuit 356. The signal processing circuit 356 then converts the value to the corresponding analog voltage expected by the actuator device 358. Thereafter, the microcontroller 352 returns to step 602 to await the next message received from the hub module 302.

The above described space system 300 is merely an exemplary illustration of the principles of the invention. The principles of the invention may readily be applied to control subsystems having more or less sensors or actuators, as well as other elements.

The relatively low power requirements enabled by the use of MEMS devices and local RF communications in the sensor modules and even the hub module allow for implementation of the modules in battery operated format. Thus, sensors may be implemented on various aspects of building operation as a practical matter than would be possible with wired sensors. However, many advantages of the present invention may be obtained in systems that use other forms of power.

An example of a single, self-powered, standalone sensor module architecture is illustrated in FIGS. 12a and 12b of U.S. patent application Ser. No. 10/672,527, filed Sep. 26, 2003, which is assigned to the assignee of the present invention and incorporated herein by reference. This architecture may be used in a wide variety of modules, including those described above in connection with FIG. 3.

One aspect of certain embodiments of the present invention is that the various non-BAS sensor and data gathering devices utilize the existing BAS infrastructure to coordinate the gathering and storing of such data such that it may be accessed through a centralized device. FIG. 8 shows an exemplary BAS system that incorporates one or more space systems similar to the systems 250 and 252 of FIG. 2.

FIG. 8 shows a block diagram of an exemplary building data system 800. The exemplary embodiment of the building data system 800 in FIG. 1 has the general architecture of commercially available building automation systems, including but not limited to the APOGEE® System available from Siemens Building Technologies, Inc. of Buffalo Grove, Ill. In accordance with the present invention, however, the building control system 800 of FIG. 1 further includes a plurality of space subsystems 801 and 803. These subsystems, which may suitably be of the type described above in connection with FIG. 2, act as an access point for certain types of BAS equipment and non-BAS related data gathering devices. As a consequence, non-BAS related authorized users may be able to separate access data from non-BAS sources through the space subsystems 801 and 803.

The control station 810 that is operable to provide both control over the BAS devices of the system 800 and further provide access to BAS-related and other building data. Those of ordinary skill in the art will readily appreciate that the system 800 of FIG. 8 is merely illustrative, and that various unique configurations exist that will incorporate the novel space subsystems in accordance with the present invention.

The building system 800 of FIG. 8 includes three levels of networks to accommodate modularity and scalability. Low level or floor level networks (e.g. network 836) are typically small deterministic networks with limited flexibility or bandwidth, but which provide for control data communication between locally controlled devices. Building level networks (e.g. building level network 824) are medium level networks that are the backbone of the building control system 800. A building level network typically connects to several floor level network and possibly large equipment, and further is connected to the control stations that allow for monitoring of all system data. Building level networks must have significant bandwidth, but do not require open access. As a result, the building level network 824 in the embodiment described herein is a token bus network. However, the building level network 824 may alternatively be an Ethernet network. The management level network 822 is a high level network used for interfacing with internal and external workstations, data repositories, and printing devices. The management level network 822 in the exemplary embodiment described herein is an open protocol network (e.g. Ethernet) that enables remote access to data within the system 800.

Referring now specifically to FIG. 8, the building system 800 includes a first control station 810, a second control station 812, a printer 814, an Internet server 816, a control panel 818, and a database 820 all operably interconnected via the management level network 822. The space subsystem 801 is also connected to the management level network 822.

The management level network 822 may suitably be an Ethernet standard network that employs the TCP/IP protocol. In such a case, the space subsystem 801 contains a communication hub that has an Ethernet network interface circuit, not shown, but which is well known in the art. The control station 810 is further connected to the building network 824, which in the embodiment described herein is a token bus network.

The printer 814 and Internet server 816 are standard components as is known in the art. The control panel 818 is an Ethernet-ready control panel that may be used to connect to another network of building control devices, not shown. The database 820 may suitably be a database server and includes memory for storing data regarding the structure of the system 800, as well as archived data regarding the operation of the system 800. The database server for the database 820 may alternatively be hosted by the control stations 810 and/or 812, or the Internet server 814.

The control station 810 is a device that includes a user interface and is operable to provide user control over (and/or monitoring of) the building control elements/devices of the system 800 in a manner which may suitably be the same as that provided by the model INSIGHT® Work Station used in connection with the APOGEE®, discussed above. The INSIGHT® Work Station is also available from Siemens Building Technologies, Inc, of Buffalo Grove, Ill. To provide such control, the control station 810 communicates building control or BAS data to and from such devices (directly or indirectly) over the building network 124. In addition, the control station 810 is operable to communicate building sensor data that is not traditionally BAS-related using the same protocols and devices. However, such data may be stored in the database 820 or elsewhere for later access by authorized users.

The building system 800 further includes various BAS control devices, such as modular building controllers 826, 828, modular equipment controllers 830, and floor level network controllers 832, which are operably connected to the building network 824. The building control devices either directly or indirectly control, detect, and/or measure environmental parameters of the building. Such parameters include temperature, air quality, smoke detection, fire detection, and other parameters normally controlled, detected and/or measured by HVAC systems, building security systems and/or building fire safety systems. Such devices are known in the art. By way of example, the modular equipment controller 830 may control a chiller plant of a building, not shown.

The floor level controller 832 is further connected a floor level network 836. The floor level network 836 is a low level network that may employ either an open communication protocol or a proprietary protocol. The floor level network 836 connects to further building control devices. Exemplary building control devices of the system 800 which are connected to the floor level network 836 include unitary controllers 838, terminal equipment controllers 840, and variable speed drives 842. The terminal equipment controller 840 may connect to traditional HVAC elements such as a temperature sensor 840*a* and a ventilation damper actuator 840*b*.

Other HVAC, fire safety, security, and building (or factory) automation devices are well known in the art and may be connected to the floor level network 836 or the building level network 824.

The other space subsystem 803 is also connected to the building level network 824. Thus, in contrast to the space subsystem 801, the space subsystem 803 includes a network interface circuit operable to communicate on a token ring or bus network.

It is noted that the modular building controllers 826 and 828 may connect to other floor level networks, not shown, which include other building control devices, not shown. Thus, the system 800 is expandable and modular. Moreover, various other space communication hubs may be connected to either the management level network 822 or the building level network 824.

It is noted that in the embodiment of FIG. 8, the space subsystems 801 and 803 are integrated into a normal BAS that also contains more traditional HVAC subsystems. One example of a tradition HVAC subsystem is illustrated by the terminal equipment controller 840 and devices 840*a*, 840*b*. Thus, FIG. 8 illustrates how the novel space subsystems 801 and 803 may be gradually integrated into existing BAS systems. In such a system, some spaces may have temperature and other HVAC conditions controlled via a standard terminal equipment controller such as the controller 840, which others are controlled in an environment of a space subsystem 801 in the manner similar to that described above in connection with FIGS. 2 and 3.

In any event, the various building devices generate building data from time to time. For example, a temperature sensor 840*a* may provide temperature measurement data that is communicated to the control station 810 via the terminal equipment controller 840 may be used to regulate temperature in a particular physical space or room. To this end, the terminal equipment controller 840 may be connected to a temperature sensor 140*a*. In such an example, the terminal equipment controller 840 obtains and/or may access building control information in the form of the temperature sensor readings from the sensor 840*a*. In another example, a motion sensor of a building security system, not shown, may generate a signal indicative of detected motion.

Also from time to time, an operator may use the control station 810 to request a subset of the available building control information generated by the building devices. The control station obtains such information via the interlinked networks and devices as is known in the art. The control station 810 obtains data from non-BAS devices in the space subsystems 801 and 803 in the same manner as that used to obtain BAS data.

In addition, an operator may also use the control station 810 to provide a "command" to one or more of the building control devices. Such commands are provided to the various building devices through the same networks and devices. For example, a command may be used to set a desire temperature, or temperature set point, for a room, space or entire building.

It will be appreciated that the above described embodiments are exemplary and that those of ordinary skill in the art may readily devise their own implementations and modifications that incorporate the principles of the present invention and fall within the spirit and scope thereof.

I claim:

1. A method comprising:
    a) operating a building automation system data acquisition infrastructure;
    b) using the building automation system data acquisition infrastructure to obtain a first set of data pertaining to at least one building automation system, the at least one building automation system comprising at least one selected from the group consisting of a fire safety system, a building security system and a heating, ventilation and air conditioning (HVAC) system;
    c) obtaining at least a second set of data based on information generated by at least one device via a wireless sensor module, the second set of data being nonintersecting with the first set of data;
    d) controlling the at least one building automation system using the first set of data and to the exclusion of the second set of data;
    e) using the building automation system data acquisition infrastructure to provide access to at least the second set of data to an authorized user.

2. The method of claim 1 wherein the second set of data includes data relating to at least one of the group consisting of: office equipment, vending machines and furniture.

3. The method of claim 2 wherein the second set of data includes data relating to office equipment.

4. The method of claim 3, further comprising storing the first set of data and the second set of data in a shared data storage.

5. The method of claim 4, further comprising storing the second set of data to a plurality of vendor data files in the shared data storage, each vendor data file associated with a party authorized to utilize said data.

6. The method of claim 5, where the first set of data and the second set of data are obtained using a shared communication network, the communication network distributed throughout a building.

7. The method of claim 6, wherein the wireless sensor module includes a MEMs device.

8. The method of claim 7, wherein the MEMs device includes a MEMs sensor, a processing circuit, and a wireless communications circuit.

9. The method of claim 8, wherein step e) further comprises providing access to the second set of data for value received from the authorized user.

10. The method of claim 8, further comprising using the building automation system data acquisition infrastructure to provide access to a third set of data to at least one authorized user, wherein the third set of data includes data relating to at least one of the group consisting of: light fixtures, architectural fixtures and plumbing fixtures.

11. The method of claim 10, wherein the third set of data includes data relating to vending machines.

12. The method of claim 11, wherein the third set of data includes data relating to furniture.

13. The method of claim 12, wherein step d) further comprises controlling an HVAC system using the first set of data.

14. The method of claim 13, wherein:
    step d) further comprises controlling the at least one building automation system using the first set of data and to the exclusion of the second set of data, said controlling performed at least in part by a control workstation of the building automation system data acquisition infrastructure;
    e) using the control workstation of the building automation system data acquisition infrastructure to provide access to at least the second set of data to an authorized user.

15. The method of claim 2, wherein the second set of data includes data relating to vending machines.

16. The method of claim 2, wherein the second set of data includes data relating to furniture.

17. The method of claim 2, further comprising storing the first set of data and the second set of data in a shared data storage.

18. The method of claim 17, further comprising storing the second set of data to a plurality of vendor data files in the shared data storage, each vendor data file associated with a party authorized to utilize said data.

19. The method of claim 2, where the first set of data and the second set of data are obtained using a shared communication network, the communication network distributed throughout a building.

20. The method of claim 2, further comprising storing the second set of data to a plurality of vendor data files, each vendor data file associated with a party authorized to utilize said data.

21. The method of claim 1, wherein:
    step d) further comprises controlling the at least one building automation system using the first set of data and to the exclusion of the second set of data, said controlling performed at least in part by a control workstation of the building automation system data acquisition infrastructure;
    e) using the control workstation of the building automation system data acquisition infrastructure to provide access to at least the second set of data to an authorized user.

22. The method of claim 1, wherein the wireless sensor module includes a MEMs device.

23. The method of claim 22, wherein the MEMs device includes a MEMs sensor, a processing circuit, and a wireless communications circuit.

24. The method of claim 1 wherein step e) further comprises providing access to the second set of data for value received from the authorized user.

25. The method of claim 1 wherein step e) further comprises further providing access to at least some of the first set of data.

26. The method of claim 1 wherein the second set of data includes data relating to at least one of the group consisting of: light fixtures, architectural fixtures and plumbing fixtures.

27. The method of claim 1, wherein step d) further comprises controlling an HVAC system using the first set of data.

* * * * *